United States Patent [19]

Collins et al.

[11] Patent Number: 4,749,513

[45] Date of Patent: Jun. 7, 1988

[54] GREEN EMITTING PHOSPHOR

[75] Inventors: John Collins, Newton; Romano G. Pappalardo, Sudbury; Baldassare Di Bartolo, Medford; Thomas E. Peters, Chelmsford, all of Mass.

[73] Assignee: GTE Laboratories Incorporated, Waltham, Mass.

[21] Appl. No.: 103,781

[22] Filed: Oct. 2, 1987

[51] Int. Cl.$^4$ .......................................... C09K 11/475
[52] U.S. Cl. ............................................. 252/301.4 H
[58] Field of Search ................................ 252/301.4 H

[56] References Cited

U.S. PATENT DOCUMENTS

| | | | |
|---|---|---|---|
| 3,233,189 | 2/1966 | Guggenheim et al. | 252/301.4 H |
| 3,541,018 | 11/1970 | Hewes et al. | 252/301.4 H |
| 3,667,921 | 6/1972 | Grodkiewicz et al. | 252/301.4 H |
| 3,702,828 | 11/1972 | Hoffman | 252/301.4 H |
| 3,785,991 | 1/1974 | Toshinai et al. | 252/301.4 H |

OTHER PUBLICATIONS

J. Th. W. deHair, "The Intermediate Role of $Gd^{3+}$ in the Energy Transfer from a Sensitizer to an Anticator", J. of Luminescence 18/19, (1979) 797–800.

J. Th. W. deHair/W. L. Konijnendijk, "The Intermediate Role of $Gd^{3+}$ in the Energy Transfer from a Sensitizer to an Activator (especially $Tb^{3+}$)", J. of Elec. Soc., vol. 127 #1, (1980) 161–164.

T. E. Peters/R. G. Pappalardo/R. B. Hunt, Jr., "Unusual Green Emission from $Mn^{2+}$ and $Gd(BO_2)_3$", J. of Luminescence 31 and 32 (1984) 290–292).

Low et al., "Mat. Res. Bull.", vol. 7, No. 3, pp. 203–212, 1972.

Primary Examiner—Jack Cooper
Attorney, Agent, or Firm—Ivan L. Ericson

[57] ABSTRACT

An efficient green emitting phosphor results from the coactivation of yttrium fluoride with gadolinium and erbium. The excitation energy absorbed by the $Gd^{3+}$ centers is transferred non-radiatively to minority $Er^{3+}$ centers, whose emission produces green light when excited by 275 nanometer or 378 nanometer radiation.

5 Claims, 3 Drawing Sheets

GREEN EMITTING PHOSPHOR

FIELD OF THE INVENTION

This invention relates to a green emitting phosphor. More particularly, this invention relates to an efficient green emitting phosphor resulting from the coactivation of yttrium fluoride with gadolinium and erbium.

BACKGROUND OF THE INVENTION

Recently literature reports, such as J. Th. W. de Hair, "The intermediate role of $Gd^{3+}$ in the energy transfer from a sensitizer to an activator", Journal of Luminescence 18/19, (1979) 797–800, J. Th. W. de Hair and W. L. Konijnendijk, "The intermediate role of $Gd^{3+}$ in the energy transfer from a sensitizer to an activator (especially $Tb^{3+}$)", Journal of Electrochem Society, Vol. 127, #1, (1980) 161–164, T. E. Peters, R. G. Pappalardo, and R. B. Hunt Jr., "Unusual green emission from $Mn^{2+}$ and $Gd(BO_2)_3$", Journal of Luminescence 31 and 32 (1984 290–292), have described how electronic excitation-energy is efficiently transferred in oxide hosts from $Gd^{3+}$ centers to coactivators capable of visible emission, such as $Tb^{3+}$, $Dy^{3+}$ and $Mn^{2+}$. However, there is no mention of efficiently transferring non-radiatively excitation energy absorbed by $Gd^{3+}$ centers to minority $Er^{3+}$ centers, whose emission produces green light as disclosed in the present invention.

SUMMARY OF THE INVENTION

In accordance with one aspect of the present invention, a new and improved green-emitting phosphor exhibits a characteristic peak emission from about 510 to about 560 nanometers when excited by about 275 nanometer excitation. The phosphor has a composition defined by the general formula:

$$Y_{1-0.65-x}Gd_{0.65}Er_xF_3$$

where p1 $0.005 \leq x \leq 0.05$.

In accordance with one aspect of the present invention, a new and improved green-emitting phosphor exhibits a characteristic peak emission from about 510 to about 560 nanometers when excited by about 378 nanometer excitation. The phosphor having a composition defined by the general formula:

$$Y_{1-0.65-x}Gd_{0.65}Er_xF_3$$

where $0.005 \leq x \leq 0.05$.

In accordance with still another aspect of the present invention, a new and improved method of making a green-emitting phosphor comprises the following steps:

Step 1—Gadolinium fluoride, erbium fluoride, yttrium fluoride, and ammonium fluoride are blended to form a mixture.

Step 2—The mixture of step 1 is heated in a vitreous-carbon crucible in a stream of dry nitrogen gas to a temperature and for a time sufficient to melt the mixture to form a melt.

Step 3—The melt from step 2 is cooled to form a fused product.

Step 4—The fused product from step 3 is ground to form a ground powder.

Step 5—The ground powder from step 4 is sieved to form a screened powder.

Step 6—The screened powder from step 5 is excited with an ultraviolet light source to obtain a green emitting phosphor.

For a better understanding of the present invention, together with other and further objects, advantages and capabilities thereof, reference is made to the following disclosure and appended claims in connection with the above described drawings.

DETAILED DESCRIPTION OF THE PREFERRED EMBODIMENTS

Figure 3:
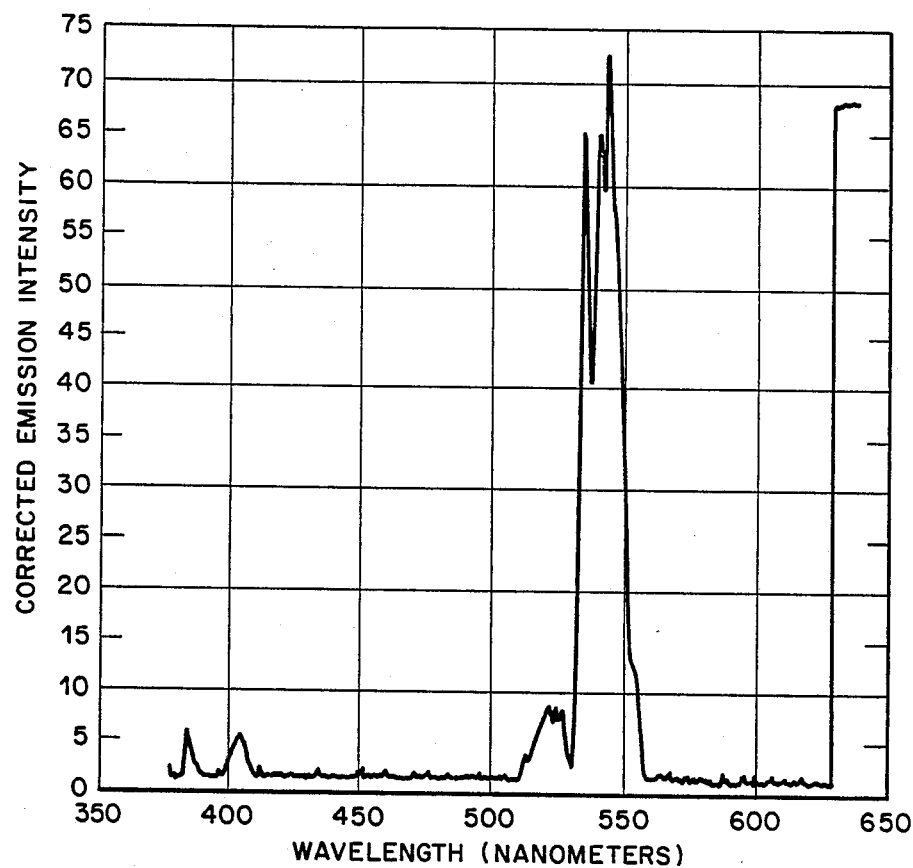
FIG. 3 depicts an emission spectrum for a phosphor composition in accordance with one aspect of the present invention when excited by a 378 nanometer source.

A phosphor of the present invention, in one specific example, was prepared by blending 11.14 grams of gadolinium fluoride, 0.18 grams of erbium fluoride, 3.97 grams of yttrium fluoride, and 0.76 grams of ammonium fluoride (approx. 5 wt.% $NH_4HF_2$). The resulting mixture was then heated in a vitreous-carbon crucible to a temperature in excess of melting point of the mixture, approx. 1330° C. for approx. 30 minutes in a stream of dry nitrogen gas. After the material was melted and cooled to room temperature, the fused product was easily removed from the vitreous-carbon crucible, ground to a powder and sieved through a 200 mesh nylon screen. The above process yielded a phosphor powder of composition $Y_{0.34}Gd_{0.65}Er_{0.01}F_3$ having an orthorhombic crystal structure. The resulting phosphor powder exhibited an emission spectrum as depicted in FIG. 1 when excited by a 275 nanometer wavelength and exhibited an emission as depicted in FIG. 3 when excited by a 378 nanometer excitation wavelength.

Figure 1:
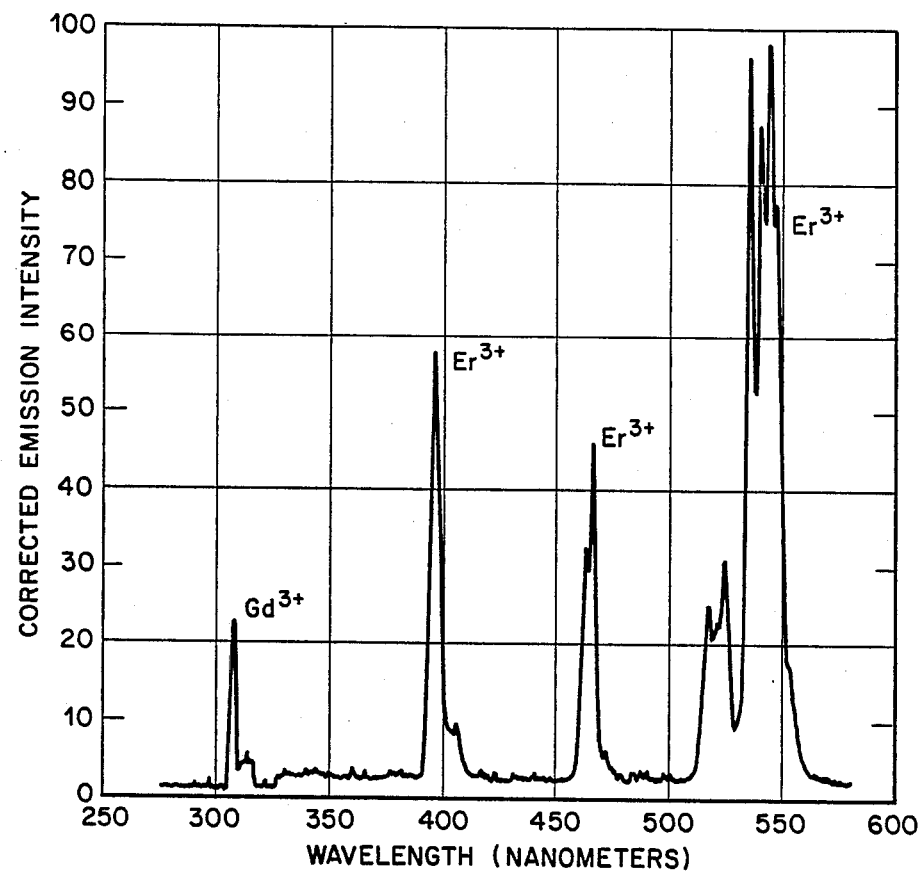
FIG. 1 depicts the emission spectrum for a phosphor composition in accordance with one aspect of the present invention when excited by a 275 nanometer source.

The 275 nanometer excitation of the phosphor of the present invention where there is a relatively strong absorption by the $Gd^{3+}$ centers and a very weak absorption by the $Er^{3+}$ centers, produces the emission spectrum depicted in FIG. 1. The emission consists of groups of emission lines occurring in several regions of the UV and visible spectrum. Since $Gd^{3+}$ is known to exhibit only emission in the ultraviolet spectral region, it is evident that the visible emission must be produced by the $Er^{3+}$ centers.

The narrow emission lines in the ultra violet, at approx. 315 nanometers depicted in FIG. 1, are the typical emission from $Gd^{3+}$ centers. In contrast, the sharp emission lines in the blue, at approx. 400 nanometers and approx. 460 nanometers; the intense group spanning the green spectral region from approx. 510 to approx. 560 nanometers; and additional lines in the red and far red region (not shown in FIG. 2) all represent emissions from the $Er^{3+}$ centers. This is confirmed by excitation spectra for green emission at 544 nanometers, shown in FIG. 2, and revealing that in the short ultra violet spectral region excitation of the emission is mainly associated with absorption by the (majority) $Gd^{3+}$ centers.

Figure 2:
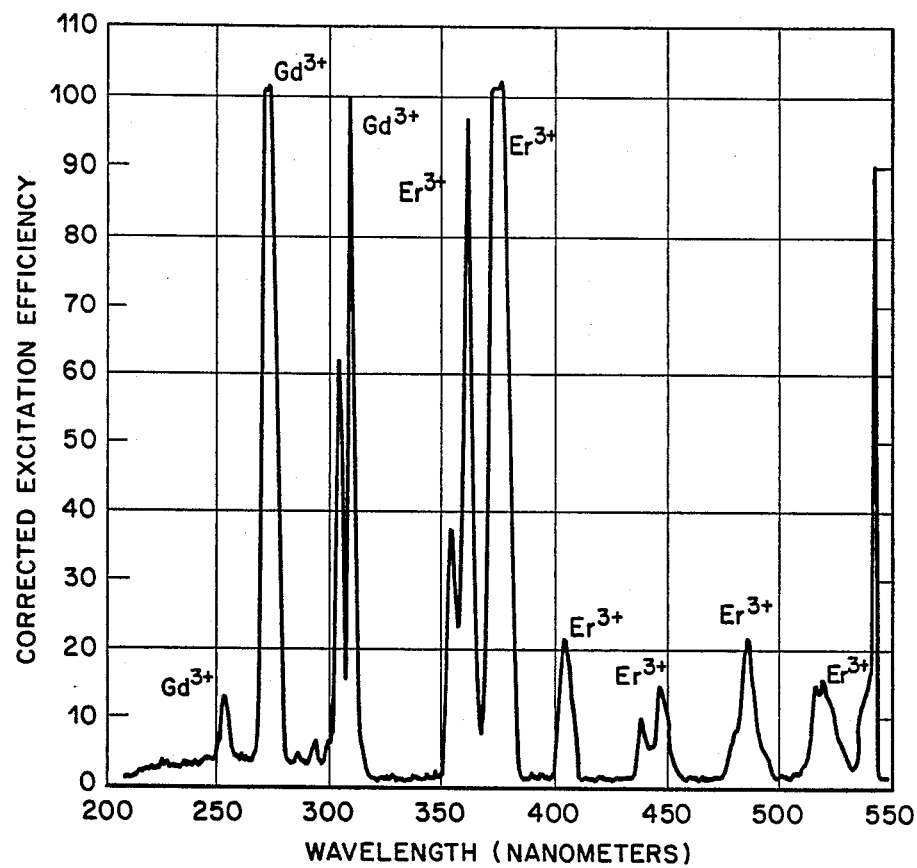
FIG. 2 depicts an excitation spectrum for a phosphor composition in accordance with one aspect of the present invention.

If the material is excited at approx. 378 nanometers, one of the excitation regions depicted in FIG. 2, the resulting emission spectrum (FIG. 3) does not contain the emission group at approx. 470 nanometers. This difference is explained on the basis of the energy level scheme for $Er^{3+}$, keeping in mind that the presence of $Er^{3+}$ at low concentrations as is the case here, and in a fluoride host, reduces the probability for inter-level non-radiative relaxation within the $Er^{3+}$ sublattice.

An additional interesting effect is the change in relative emission intensity from FIG. 1 to FIG. 3, both for the emission group at approx. 400 nanometers, and for the emission group in the green spectral region. It is contended that the narrow emission lines, generally missing from the emission spectrum of FIG. 3, originate from the $^2P_{3/2}$ level of $Er^{3+}$, which is expected to be close in energy to the $Gd^{3+}$ emitting level at approx. 310 nanometers, and which is most likely the acceptor level in the $Gd^{3+}$ to $Er^{3+}$ energy transfer.

The visible emission from $^2P_{3/2}$ of $Er^{3+}$ to intermediate excited levels of $Er^{3+}$, located in energy in the visible spectral region, can in turn lead to a Photon Cascade Emission process, whereby a single ultra violet photon absorbed by $Gd^{3+}$ is transferred to the $^2P_{3/2}$ level of $Er^{3+}$, and converted by the latter center into two visible photons.

In addition to the above formulation utilizing the preferred 0.01 moles of erbium, the erbium formulation was varied from about 0.005 moles of erbium to about 0.05 moles of erbium in which the yttrium concentration was varied in accordance with the following formula: $Y_{1-0.65-x}Gd_{0.65}Er_x$ in which x represents the concentration of the erbium in moles.

Table I shows the relative emission intensity as a function of the erbium concentration in which the emission of the material containing 0.01 moles of erbium was normalized at 100.

TABLE I

| Normalized Emission Intensity from $Y_{1-0.65-x}Gd_{0.65}Er_x$ (for 275 nm excitation) | |
|---|---|
| $Y_{0.345}Gd_{0.65}Er_{0.005}$ | 60 |
| $Y_{0.34}Gd_{0.65}Er_{0.01}$ | 100 |
| $Y_{0.32}Gd_{0.65}Er_{0.03}$ | 76 |
| $Y_{0.030}Gd_{0.65}Er_{0.05}$ | 40 |

As depicted in FIG. 1 the new green emitting phosphor of the present invention has an intense green spectrum distribution from approx. from 510 to approx. 560 nanometers when excited with 275 nanometer wavelength.

While there has been shown and described what is at present considered the preferred embodiment of the invention, it will be obvious to those skilled in the art that various changes and modification may be made therein departing from the scope of the invention as defined by the appended claims.

What is claimed is:

1. A green emitting $Gd^{3+}$ and $Er^{3+}$ coactivated phosphor exhibiting a characteristic peak emmission from about 510 to about 560 nanometers when excited by about 275 nanometers or about 378 nanometers excitation, said phosphor having a composition defined by the general formula:

where
$0.005 \leq x \leq 0.05$.

2. A green emitting phosphor in accordance with claim 1 wherein said x is about 0.01.

3. A method of making a green emitting $Gd^{3+}$ and $Er^{3+}$ coactivated phosphor exhibiting a characteristic peak emission from about 510 to about 560 nanometers when excited by about 275 nanometers or about 378 nanometers excitation, said phosphor having a composition defined by the general formula: $Y_{1-0.65-x}Gd_{0.65}Er_xF_3$ where $0.005 \leq X \leq 0.05$ comprising the following steps:

Step 1—blending gadolinium fluoride, erbium fluoride, yttrium fluoride, in amounts corresponding to said general formula and ammonium fluoride to form a mixture;

Step 2—heating said mixture of step 1 in a vitreous-carbon crucible in a stream of dry nitrogen gas to a temperature and for a time sufficient to melt said mixture to form a melt;

Step 3—cooling said melt from step 2 to form a fused product;

Step 4—grinding said fused product to form a ground powder; and

Step 5—sieving said ground powder to obtain said phosphor

4. A method in accordance with claim 3 wherein said temperature is about 1330° C.

5. A method in accordance with claim 3 wherein said time is approximately 30 minutes.

* * * * *